US010663217B2

(12) United States Patent
Kuehl et al.

(10) Patent No.: US 10,663,217 B2
(45) Date of Patent: *May 26, 2020

(54) VACUUM INSULATED STRUCTURE TUBULAR CABINET CONSTRUCTION

(71) Applicant: WHIRLPOOL CORPORATION, Benton Harbor, MI (US)

(72) Inventors: Steven J. Kuehl, Stevensville, MI (US); Axel Julio Ramm, Saint Joseph, MI (US); Guolian Wu, Saint Joseph, MI (US); James W. Kendall, Mount Prospect, IL (US); Nihat Cur, Saint Joseph, MI (US); Paul B. Allard, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 79 days.

This patent is subject to a terminal disclaimer.

(21) Appl. No.: 15/794,785

(22) Filed: Oct. 26, 2017

(65) Prior Publication Data

US 2018/0045455 A1    Feb. 15, 2018

Related U.S. Application Data

(60) Continuation of application No. 14/731,796, filed on Jun. 5, 2015, now Pat. No. 9,835,369, which is a
(Continued)

(51) Int. Cl.
*F25D 23/06* (2006.01)
*F25D 11/00* (2006.01)
(Continued)

(52) U.S. Cl.
CPC ............ *F25D 23/065* (2013.01); *B23P 15/26* (2013.01); *B29C 53/00* (2013.01); *F25B 39/00* (2013.01);
(Continued)

(58) Field of Classification Search
CPC ...... F25D 23/06; F25D 23/065; F25D 23/062; F25D 23/08; F25D 2201/14;
(Continued)

(56) References Cited

U.S. PATENT DOCUMENTS 948,541 A    2/1910 Coleman
1,275,511 A    8/1918 Welch
(Continued)

FOREIGN PATENT DOCUMENTS

CA           626838 A    5/1961
CA           1320631     7/1993
(Continued)

OTHER PUBLICATIONS

Machine Translation of JP 2000-097390A (Year: 2000).*
(Continued)

*Primary Examiner* — Christopher J Besler
(74) *Attorney, Agent, or Firm* — Price Heneveld LLP

(57) ABSTRACT

A refrigerator includes a vacuum insulated cabinet structure having side walls that are formed from a tube that has been folded/deformed into a structure having an "O" shape with vertically enlarged front and rear openings. The interior of the tube may be filled with silica powder or other filler, and a vacuum is formed within the tube. An insulated rear panel may be utilized to close off the rear opening of the vacuum insulated cabinet structure.

17 Claims, 7 Drawing Sheets

Related U.S. Application Data division of application No. 13/836,143, filed on Mar. 15, 2013, now Pat. No. 9,071,907.

(60) Provisional application No. 61/618,914, filed on Apr. 2, 2012.

(51) Int. Cl.
    *F25B 39/02* (2006.01)
    *F25D 23/02* (2006.01)
    *F25B 39/00* (2006.01)
    *B29C 53/00* (2006.01)
    *H04R 3/12* (2006.01)
    *B23P 15/26* (2006.01)
    *F25C 1/00* (2006.01)

(52) U.S. Cl.
    CPC ............... *F25B 39/02* (2013.01); *F25C 1/00* (2013.01); *F25D 11/00* (2013.01); *F25D 23/028* (2013.01); *F25D 23/062* (2013.01); *F25D 23/063* (2013.01); *H04R 3/12* (2013.01); *F25D 2201/14* (2013.01); *Y10T 29/49002* (2015.01); *Y10T 29/49359* (2015.01); *Y10T 29/49616* (2015.01); *Y10T 29/49826* (2015.01); *Y10T 29/49879* (2015.01); *Y10T 29/49947* (2015.01); *Y10T 156/1051* (2015.01); *Y10T 428/231* (2015.01)

(58) Field of Classification Search
    CPC .. F25D 23/064; F25D 23/063; F25D 2201/11; F25D 2201/00; B29C 52/08; B29C 53/083; B29C 53/36; B21D 7/00
    See application file for complete search history.

(56) References Cited

U.S. PATENT DOCUMENTS

| | | |
|---|---|---|
| 1,849,369 A | 3/1932 | Frost |
| 1,921,576 A | 8/1933 | Duffy |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,792,959 A | 5/1957 | Diamond et al. |
| 2,809,764 A | 10/1957 | Diamond |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,118,266 A | 10/1978 | Kerr |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,951,652 A * | 8/1990 | Ferrario ............ F24C 15/04 126/190 |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |

(56) References Cited

U.S. PATENT DOCUMENTS

| | | |
|---|---|---|
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,704,107 A | 1/1998 | Schmidt et al. |
| 5,716,581 A | 2/1998 | Tirrell et al. |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |
| 5,826,780 A | 10/1998 | Neeser et al. |
| 5,827,385 A | 10/1998 | Meyer et al. |
| 5,834,126 A | 11/1998 | Sheu |
| 5,843,353 A | 12/1998 | DeVos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,037,033 A | 3/2000 | Hunter |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,941 B1 | 7/2001 | Nishimoto |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,486,215 B2 | 7/2013 | Amann |
| 8,491,070 B2 | 7/2013 | Davis et al. |
| 8,516,845 B2 | 8/2013 | Wuesthoff et al. |

(56) References Cited

U.S. PATENT DOCUMENTS

| | | |
|---|---|---|
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,056,952 B2 | 6/2015 | Eilbracht et al. |
| 9,062,480 B2 | 6/2015 | Litch |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,927,169 B2 | 3/2018 | Baker et al. |
| 9,976,753 B2 | 5/2018 | Hynes |
| 10,024,544 B2 | 7/2018 | Bhogal et al. |
| 10,077,342 B2 | 9/2018 | An et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0206464 A1 | 8/2010 | Heo et al. |
| 2010/0218543 A1 | 9/2010 | Ducharme |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horii et al. |
| 2011/0315693 A1 | 12/2011 | Cur et al. |
| 2012/0000234 A1 | 1/2012 | Adamski et al. |
| 2012/0011879 A1 | 1/2012 | U |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCracken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |

(56) References Cited

U.S. PATENT DOCUMENTS

| | | | |
|---|---|---|---|
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0311667 A1 | 10/2014 | Siudzinski et al. |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | | |
|---|---|---|---|
| CA | 2259665 | | 1/1998 |
| CA | 2640006 | | 8/2007 |
| CN | 1158509 | | 7/2004 |
| CN | 1970185 | | 5/2007 |
| CN | 100359272 | | 1/2008 |
| CN | 101437756 | | 5/2009 |
| CN | 201680116 | | 12/2010 |
| CN | 201748744 | U | 2/2011 |
| CN | 102296714 | | 5/2012 |
| CN | 102452522 | | 5/2012 |
| CN | 102717578 | A | 10/2012 |
| CN | 102720277 | | 10/2012 |
| CN | 103072321 | | 5/2013 |
| CN | 202973713 | U | 6/2013 |
| CN | 203331442 | | 12/2013 |
| CN | 104816478 | A | 8/2015 |
| CN | 105115221 | | 12/2015 |
| CN | 2014963379 | U | 1/2016 |
| DE | 1150190 | | 6/1963 |
| DE | 4110292 | A1 | 10/1992 |
| DE | 4409091 | | 9/1995 |
| DE | 19818890 | | 11/1999 |
| DE | 19914105 | | 9/2000 |
| DE | 19915311 | | 10/2000 |
| DE | 19948361 | | 4/2001 |
| DE | 102008026528 | | 12/2009 |
| DE | 102009046810 | | 5/2011 |
| DE | 102010024951 | | 12/2011 |
| DE | 102011051178 | A1 | 12/2012 |
| DE | 102012223536 | | 6/2014 |
| DE | 102012223541 | | 6/2014 |
| EP | 0260699 | | 3/1988 |
| EP | 0480451 | | 4/1992 |
| EP | 0645576 | A1 | 3/1995 |
| EP | 0691518 | | 1/1996 |
| EP | 0860669 | | 8/1998 |
| EP | 1087186 | | 3/2001 |
| EP | 1200785 | | 5/2002 |
| EP | 1243880 | | 9/2002 |
| EP | 1496322 | | 1/2005 |
| EP | 1505359 | | 2/2005 |
| EP | 1602425 | A1 | 12/2005 |
| EP | 1624263 | A2 | 8/2006 |
| EP | 1344008 | | 9/2006 |
| EP | 1484563 | | 10/2008 |
| EP | 1338854 | | 12/2009 |
| EP | 2342511 | | 8/2012 |
| EP | 2543942 | A2 | 1/2013 |
| EP | 2607073 | | 6/2013 |
| EP | 2789951 | | 10/2014 |
| EP | 2801774 | | 11/2014 |
| EP | 2878427 | A1 | 6/2015 |
| FR | 2980963 | | 4/2013 |
| FR | 2991698 | A1 | 12/2013 |
| GB | 837929 | | 6/1960 |
| GB | 1214548 | | 6/1960 |
| JP | 4828353 | | 8/1973 |
| JP | 51057777 | | 5/1976 |
| JP | 59191588 | | 12/1984 |
| JP | 1318880 | | 12/1989 |
| JP | 03013779 | | 1/1991 |
| JP | 404165197 | | 6/1992 |
| JP | 04165197 | | 10/1992 |
| JP | 04309778 | A | 11/1992 |
| JP | 06159922 | | 6/1994 |
| JP | 7001479 | | 1/1995 |
| JP | H07167377 | | 7/1995 |
| JP | 8145547 | | 6/1996 |
| JP | 08300052 | | 11/1996 |
| JP | H08303686 | | 11/1996 |
| JP | H09166271 | | 6/1997 |
| JP | 10113983 | | 5/1998 |
| JP | 11159693 | A | 6/1999 |
| JP | 11311395 | | 11/1999 |
| JP | 11336990 | | 12/1999 |
| JP | 2000097390 | | 4/2000 |
| JP | 2000097390 | A * | 4/2000 |
| JP | 2000117334 | | 4/2000 |
| JP | 2000320958 | A | 11/2000 |
| JP | 2001038188 | | 2/2001 |
| JP | 2001116437 | | 4/2001 |
| JP | 2001336691 | | 12/2001 |
| JP | 2001343176 | | 12/2001 |
| JP | 2002068853 | | 3/2002 |
| JP | 3438948 | | 8/2003 |
| JP | 03478771 | | 12/2003 |

(56) References Cited

FOREIGN PATENT DOCUMENTS

| | | |
|---|---|---|
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161834 A | 6/2006 |
| JP | 2006161945 | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 9980964 A1 | 4/1999 |
| WO | 199920964 | 4/1999 |
| WO | 1999030964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2006120183 | 11/2006 |
| WO | 2006120198 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | WO-2011108850 A2 * | 9/2011 ............ F16L 59/065 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Kitchen Aid, "Refrigerator User Instructions," 120 pages, published Sep. 5, 2015.
BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™," web page, 2 pages, date unknown, http://product-finder.basf.com/group/corporate/product-finder/en/brand/BALINDUR, at least as early as Dec. 21, 2015.

(56) References Cited

OTHER PUBLICATIONS

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.
European Patent Office Communication pursuant to Article 94(3) EPC, Application No. 14/158,608.1-1009/RefN402346eP MN, dated Mar. 20, 2018, (7 pages).
Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.

* cited by examiner

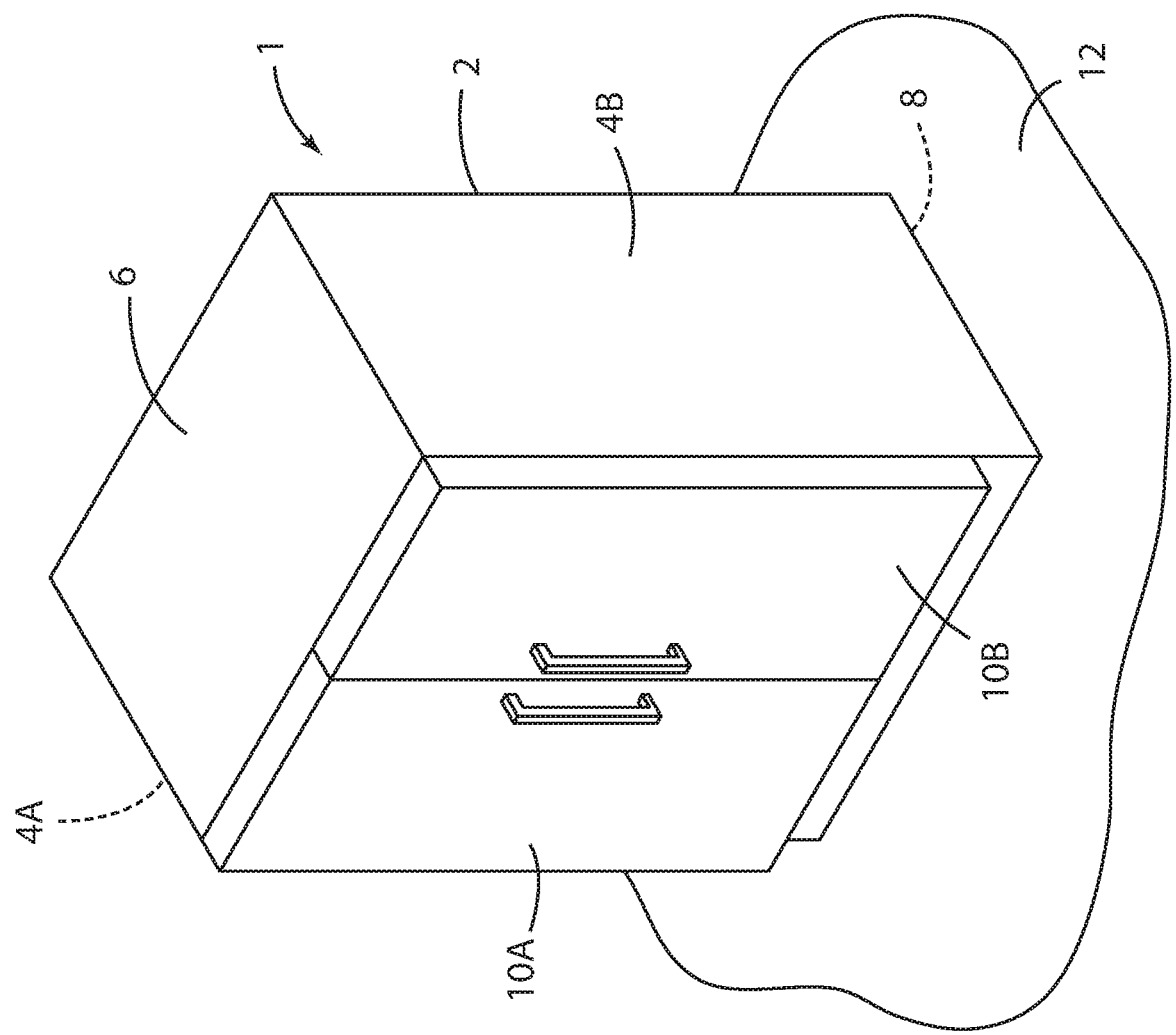

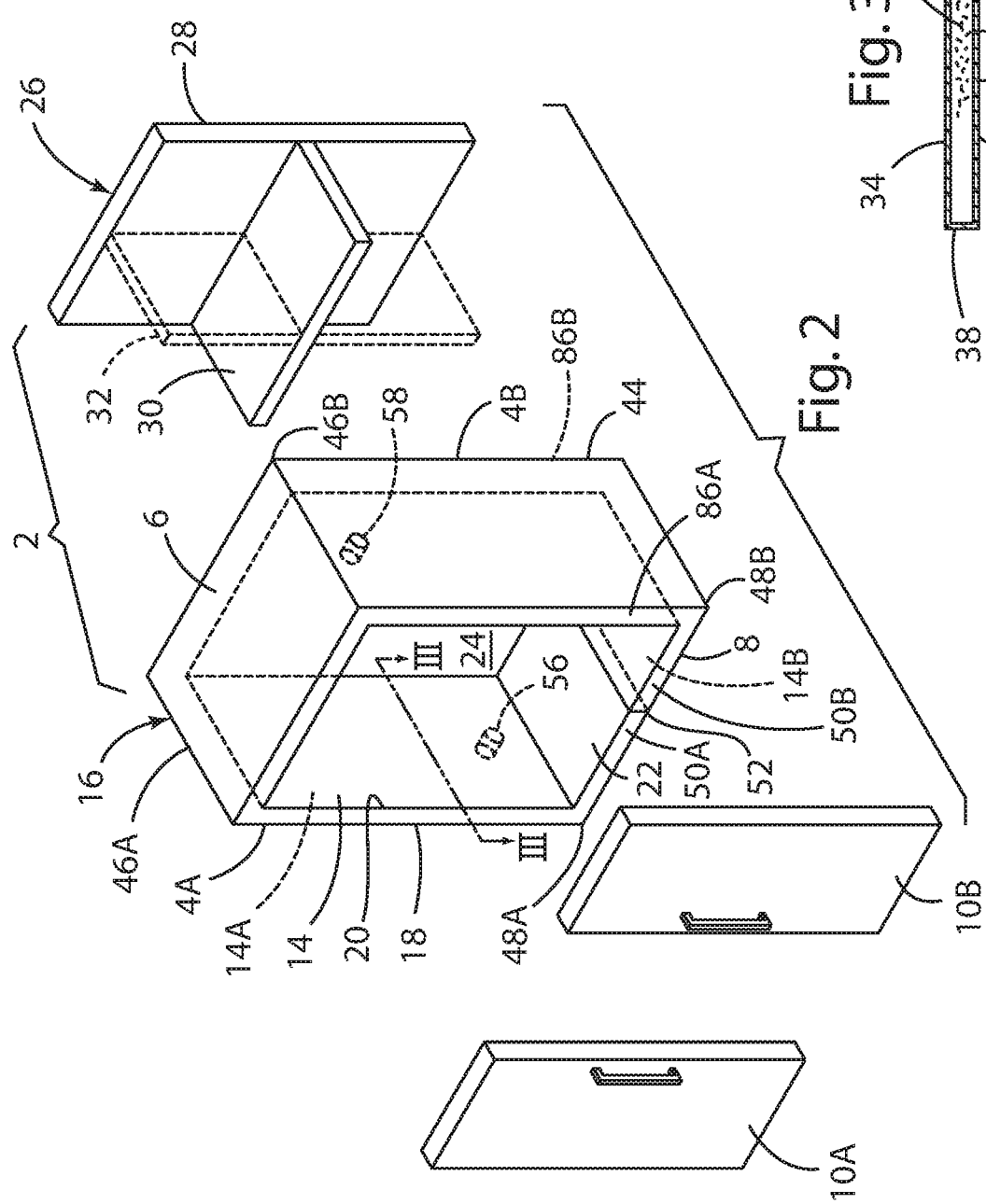

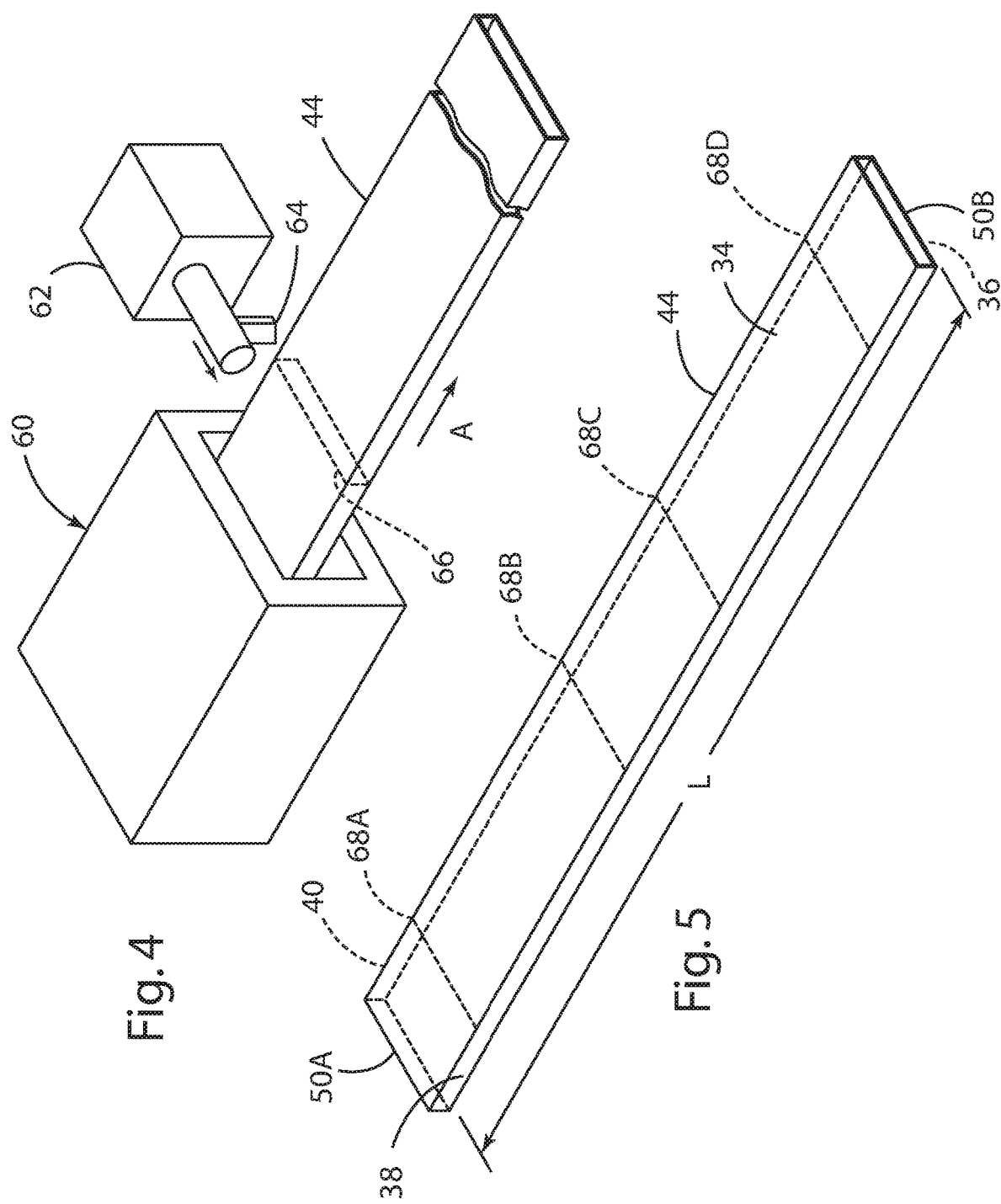

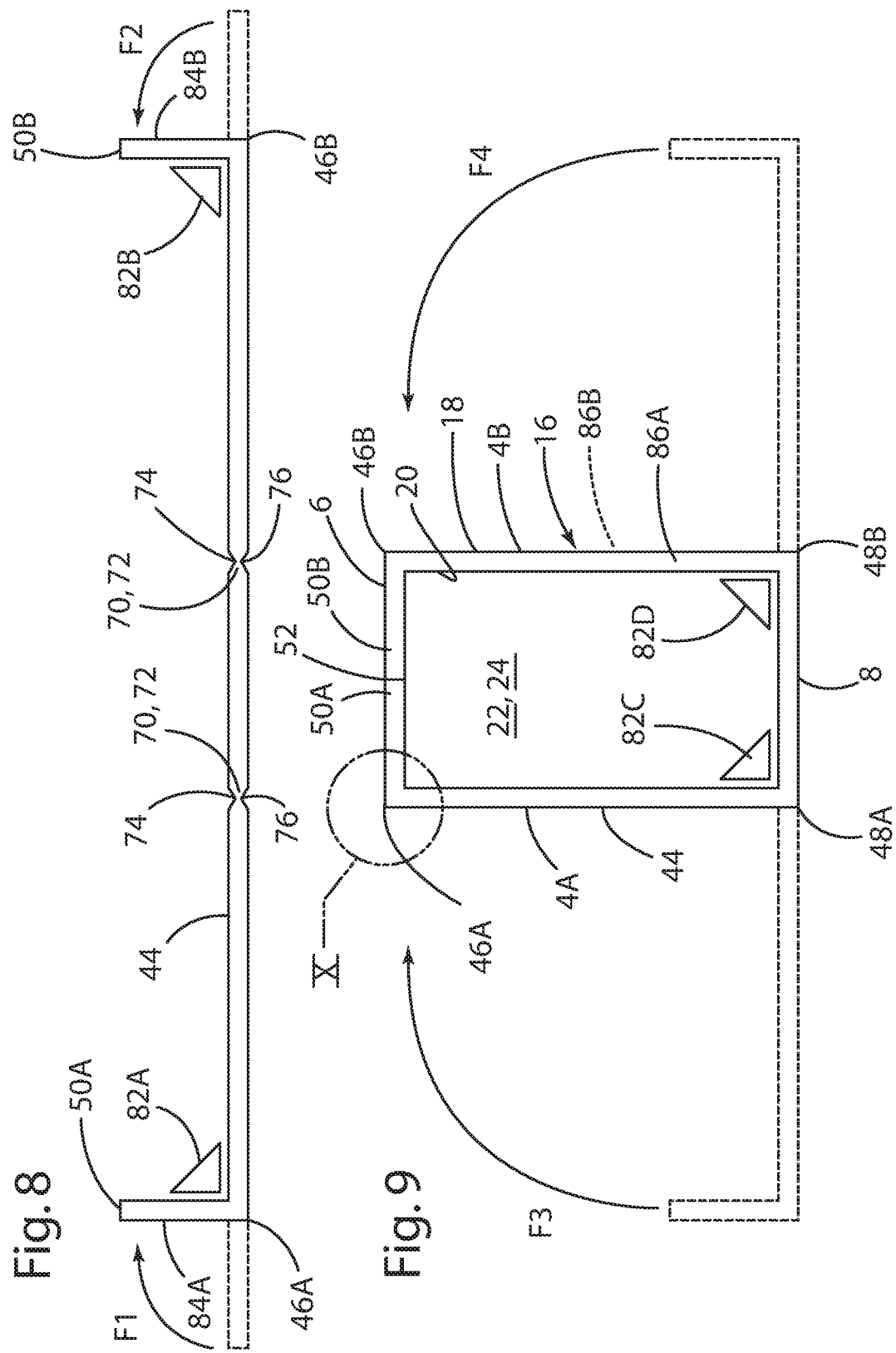

VACUUM INSULATED STRUCTURE
TUBULAR CABINET CONSTRUCTION

CROSS-REFERENCE TO RELATED
APPLICATIONS

The present application is a continuation of U.S. patent application Ser. No. 14/731,796 filed on Jun. 5, 2015 and entitled "VACUUM INSULATED STRUCTURE TUBULAR CABINET CONSTRUCTION," now U.S. Pat. No. 9,835,369, which issued on Dec. 5, 2017, which is a divisional of U.S. patent application Ser. No. 13/836,143 filed on Mar. 15, 2013, now U.S. Pat. No. 9,071,907, entitled "VACUUM INSULATED STRUCTURE TUBULAR CABINET CONSTRUCTION," which claims the benefit of U.S. Provisional Patent Application No. 61/618,914 filed on Apr. 2, 2012, entitled "ENERGY EFFICIENT HOME APPLIANCES." Each of the above-identified applications are hereby incorporated by reference.

The present application is also related to U.S. patent application Ser. No. 13/833,635, filed Mar. 15, 2013, entitled "A METHOD TO CREATE VACUUM INSULATED CABINETS FOR REFRIGERATORS," now abandoned; and U.S. patent application Ser. No. 13/836,669, filed Mar. 15, 2013, entitled "FOLDED VACUUM INSULATED STRUCTURE," now U.S. Pat. No. 9,140,481; and U.S. patent application Ser. No. 13/835,449, filed Mar. 15, 2013, entitled "A VACUUM PANEL CABINET STRUCTURE FOR A REFRIGERATOR," now U.S. Pat. No. 8,944,541; and U.S. patent application Ser. No. 13/832,246, filed Mar. 15, 2013, entitled "DUAL COOLING SYSTEMS TO MINIMIZE OFF-CYCLE MIGRATION LOSS IN REFRIGERATORS WITH A VACUUM INSULATED STRUCTURE," now U.S. Pat. No. 9,182,158; and U.S. patent application Ser. No. 13/833,696, filed Mar. 15, 2013, entitled "VACUUM INSULATED DOOR STRUCTURE AND METHOD FOR THE CREATION THEREOF," now U.S. Pat. No. 9,038,403; and U.S. patent application Ser. No. 13/837,659, filed Mar. 15, 2013, entitled "FOLDED VACUUM INSULATED STRUCTURE," now U.S. Pat. No. 8,986,483; and U.S. patent application Ser. No. 13/833,635, filed Mar. 15, 2013, entitled "METHOD TO CREATE VACUUM INSULATED CABINETS FOR REFRIGERATORS," now abandoned, all of which are incorporated herein by reference in their entirety.

BACKGROUND OF THE INVENTION

Various types of insulated cabinet structures have been developed for refrigerators, freezers and the like. Known refrigerator cabinet structures may include inner and outer walls with urethane foam or other insulating material disposed between the inner and outer walls.

SUMMARY OF THE INVENTION

One aspect of the present invention is a method of fabricating a vacuum insulated refrigerator housing. The method includes forming an elongated tube having opposite open ends defining a link therebetween. The tube may be formed from a metal material, or the tube may comprise multiple layers of polymer material, wherein one of the layers is substantially impermeable to gasses such as nitrogen, oxygen and water vapor. The elongated tube has a substantially uniform cross-sectional shape along the length of the tube, and the tube defines generally planar first and second oppositely facing primary outer surfaces. The tube further includes first and second end surfaces extending between the first and second primary outer surfaces. The method further includes forming the tube along at least four fold lines to form at least four corners, whereby portions of the first primary surface adjacent each corner are substantially orthogonal relative to one another. The method further includes sealing the opposite ends of the elongated tube to form an air-tight insulating space within the tube. The opposite ends of the tubes are connected to one another to form a refrigerator housing structure that is generally "O" shaped with horizontally spaced apart, generally vertical side walls and vertically spaced apart generally horizontal upper and lower side walls forming four corners. The refrigerator housing structure defines an internal space having enlarged front and rear openings. The method further includes forming a vacuum in the insulating space within the tube, and attaching an insulated rear panel to the refrigerator housing structure to at least partially close off the enlarged rear opening.

Another aspect of the present invention is a method of forming a vacuum insulated refrigerator housing structure. The method includes forming an elongated tube having opposite ends. The opposite ends are sealed to form an air-tight insulating space within the tube. The method further includes forming a vacuum in the air-tight insulating space, and positioning the opposite ends of the tube adjacent to one another by deforming the tube. The opposite ends are connected together to form a refrigerator housing structure that is generally "O" shaped with spaced apart upright side walls, and spaced apart upper and lower side walls extending between the upright side walls. The refrigerator housing structure defines an internal space and enlarged front and rear openings.

Another aspect of the present invention is a vacuum insulated refrigerator housing structure including a pair of horizontally spaced apart upright side walls defining upper and lower end portions. The vacuum insulated refrigerator housing structure also includes an upper side wall having opposite ends connected to the upper end portions of the upright side walls, and a lower side wall having opposite ends connected to the lower end portions of the upright side walls. The upright side walls and the upper and lower side walls comprise a one-piece integral tubular structure forming air-tight insulating space within the upright side walls and the upper and lower side walls. The air-tight insulating space is evacuated and thus forms a vacuum insulated structure.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is an isometric view of a refrigerator having a vacuum insulated tubular cabinet according to one aspect of the present invention;

FIG. 2 is an exploded isometric view of the refrigerator of FIG. 1;

FIG. 3 is a cross-sectional view of the refrigerator housing of FIG. 2 taken along the line III-III;

FIG. 4 is a partially schematic isometric view of an extrusion apparatus and process;

FIG. 5 is an isometric view of a tube prior to bending;

FIG. 8 is a partially schematic view showing the tube of FIG. 5 during the bending process;

FIG. 9 is a partially schematic view showing the tube of FIG. 5 during a second step of the bending process.

DETAILED DESCRIPTION

Figure 6:
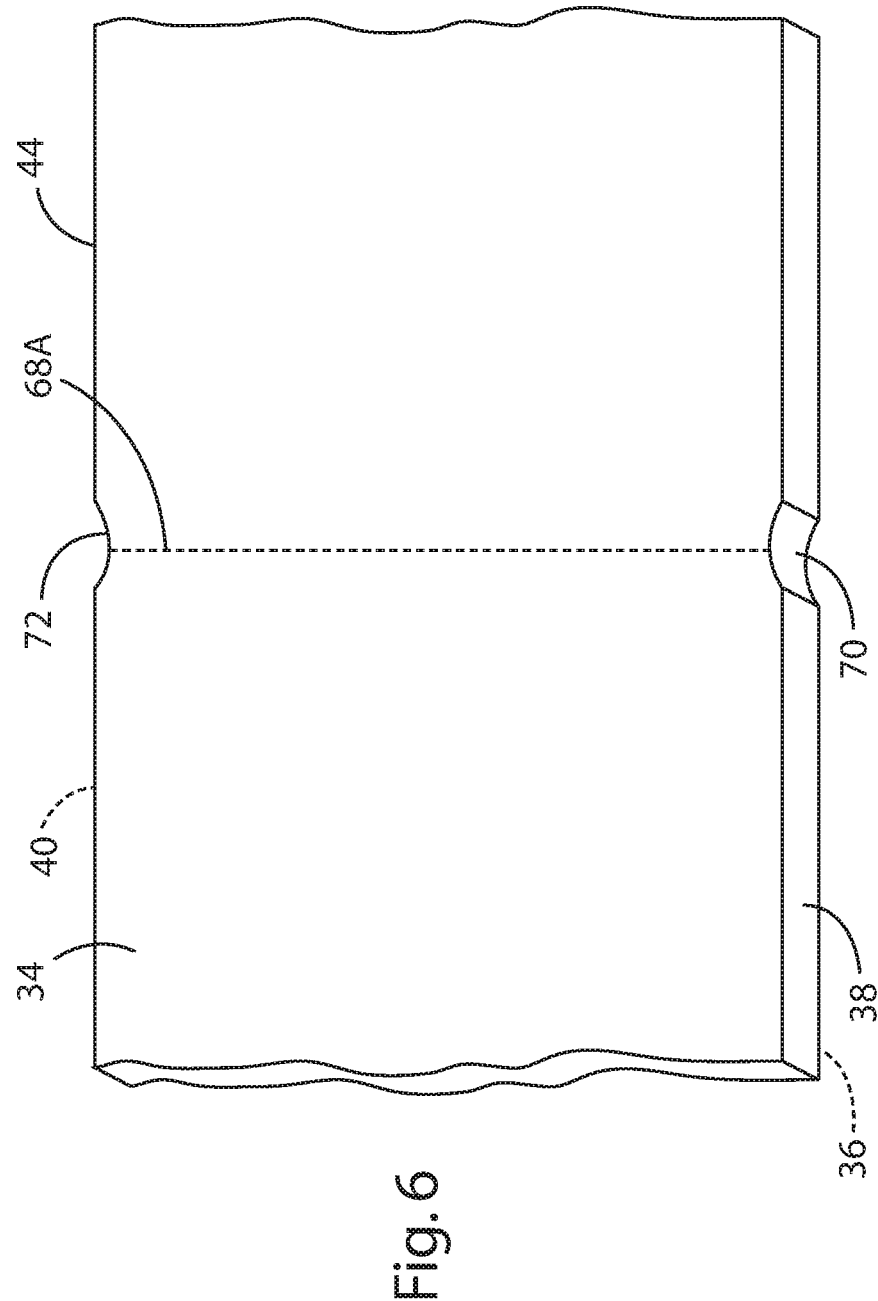
FIG. 6 is a partially fragmentary isometric view of a portion of the tube of FIG. 5.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes an insulated cabinet structure 2 including generally upright side walls 4A and 4B, a horizontally extending upper side wall 6, and a generally horizontal lower side wall 8. Doors 10A and 10B are moveably connected to the insulated cabinet structure 2 to provide access to an insulated interior space 14 (see also FIG. 2) of the refrigerator 1. The refrigerator 1 is generally configured to be supported free-standing on a floor surface 12.

With further reference to FIG. 2, the insulated cabinet structure 2 includes a tubular primary structure 16 forming upright side walls 4A and 4B, upper side wall 6, and lower side wall 8. The tubular primary structure 16 is generally O-shaped, with a rectangular outer perimeter 18, and a rectangular inner perimeter 20. The inner perimeter 20 defines an enlarged rectangular front opening 22 and a rectangular rear opening 24. When assembled, the rear opening 24 is closed off by a rear wall assembly 26. The rear wall assembly 26 includes an upright panel 28, and a mullion cooling system 30. The rear wall assembly 26 may optionally include an insulated vertical panel or divider 32 that divides the insulated interior space 14 into a first space 14A and a second space 14B. The first space 14A may comprise a freezer space, and the space 14B may comprise a fresh food compartment. The mullion cooling system 30 may include an interior volume (not specifically shown in FIG. 2) that is configured to receive mechanical equipment for operating the various functions of the refrigerator 1. For example, a cooling module set can be disposed within the interior volume of the mullion 30. Examples of various cooling modules are disclosed in U.S. patent application Ser. No. 13/108,226 entitled "COOLING SYSTEM INTEGRATION ENABLED PLATFORM ARCHITECTURE" filed on May 15, 2011, now abandoned; U.S. patent application Ser. No. 13/108,293 entitled "FLEXIBLE COOLING SYSTEM INTEGRATION FOR MULTIPLE PLATFORMS" filed on May 16, 2011, now U.S. Pat. No. 8,820,112; and U.S. patent application Ser. No. 13/108,183 entitled "UNIVERSAL AND FLEXIBLE COOLING MODULE SET (CMS) CONFIGURATION AND ARCHITECTURE" filed on May 16, 2011, now U.S. Pat. No. 10,018,396. Each of these applications is hereby incorporated herein by reference in their entirety.

The tubular primary structure 16 is made from an elongated tube 44 (FIG. 5) that includes generally planar side walls 34 and 36 (FIG. 3), and edge or end walls 30 and 40 extending transversely between the inner and outer walls 36. As discussed in more detail below, the tubular primary structure 16 (FIG. 2) is made from a single elongated tube 44 that is deformed to form upper corners 46A and 46B, and lower corners 48A and 48B. Ends 50A and 50B of the tube are interconnected along an air-tight seam 52 that is preferably located in lower side wall 8. The tubular primary structure 16 includes a continuous, sealed insulating space 42 that is preferably filled with a porous filler material 54. The filler material 54 may comprise a silica powder such as fumed silica or other suitable material, and a vacuum may be formed in space 42 utilizing one or more inlet valves 56, and one or more outlet valves 58. Filler material 54 prevents collapse of tube 44 due to the vacuum formed in space 42 and provides superior insulation performance under vacuum.

With further reference to FIG. 4, tube 44 is initially formed utilizing an extrusion process. An extruding apparatus 60 extrudes the tube 44 in the direction of the arrow "A". The extruding apparatus 60 may comprise a suitable known device. The tube 44 may be formed from a metal material such as low carbon steel, stainless steel, aluminum, or other suitable metal. Alternately, tube 44 may comprise a thermoplastic polymer material such as high impact polystyrene that is co-extruded with a layer of impermeable polymer material such as ethylene vinyl alcohol (EVOH). The EVOH layer is substantially impermeable to oxygen, nitrogen and water vapor to thereby enable formation and maintenance of a vacuum in internal space 42 when the tube 44 is formed into the tubular primary structure 16 (see also FIG. 2).

After a sufficient length of tubing 44 is extruded (FIG. 4), a cutting device or apparatus 62 having a cutter 64 is utilized to cut the elongated tube 44 along a plane 66 to thereby form a tube 44 (FIG. 5) having opposite ends 50A and 50B defining a length "L". As discussed in more detail below, the tube 44 is bent along the fold lines 68A-68D to form corners 46A, 46B, 48A and 48B of the tubular primary structure 16 (FIG. 2). With further reference to FIG. 6, prior to formation of the corners 46A, 46B, 48A and 48B, the side walls 38 and 40 are first deformed inwardly at each fold line 68A-68D to form indentations 70 and 72. If tube 44 comprises a metal material, the indentations 70 and 72 may be formed utilizing dies or other known metal forming tools (not shown). If the tube 44 comprises a polymer material, the indentations 70 and 72 may be formed by first heating the elongated tube 44 to soften the polymer material, and a forming tool (not shown) may be utilized to push in the side walls 38 and 40 to form the indentations 70 and 72.

Figure 7:
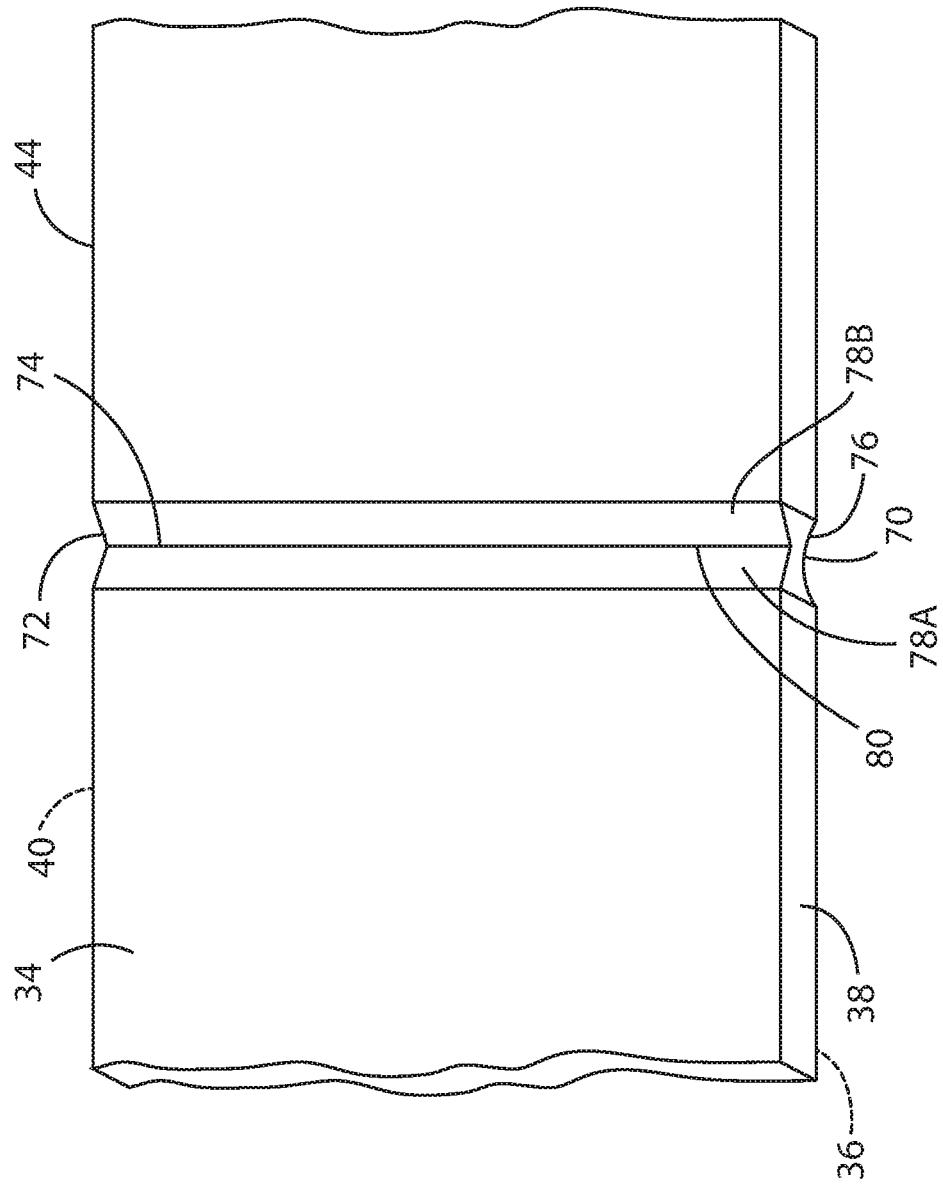
FIG. 7 is a partially fragmentary isometric view of a portion of the tube of FIG. 5.

With further reference to FIG. 7, elongated grooves or indentations 74 and 76 (76 not anticipated but could be employed) may also be formed in one or both of side walls 34 and 36 at each fold line 68A-68D. The grooves 74 and 76 may be formed in addition to the indentations 70 and 72, or the grooves 74 and 76 may be formed in a tube 44 that does not include indentations 70 and 72. The grooves 74 and 76 include angled side walls 78A and 78B that intersect at a line or crease 80. The grooves 74 and/or 76 may be formed by heating the tube 44 if the tube 44 is formed of a polymer material, followed by pressing a forming tool (not shown) into the side wall 34 and/or 36 of tube 44. If tube 44 is made of a metal material, a conventional forming die or the like (not shown) may be utilized to form the grooves 74 and 76.

After formation of indentations 70 and/or 72 and grooves 74 and/or 76, the tube 44 is bent utilizing forming tools 82A-82D to form corners 46A, 46B, 48A and 48B as shown in FIGS. 8-9. The ends 50A and 50B are then joined together at seam 52. Seam 52 may comprise a welded joint or other suitable air-tight joint that is capable of maintaining a vacuum in the interior space 42 of the tubular primary structure 16. Prior to bending the tube as shown in FIGS. 8-9, the tube 44 may be filled with powdered silica such as fumed silica or other filler material. In general, the filler material 54 is inserted and compacted into the interior space 42 of tube 44 through one or both open ends 50A or 50B. Alternatively, as discussed below, the filler material 54 may be inserted into the interior space 42 utilizing valves/openings 56 and 58 (FIG. 2) after the tube 44 is deformed (FIGS. 8-9), and ends 50A and 50B are interconnected at seam 52.

With reference to FIG. 8, forming tools 82A and 82B are positioned along fold lines 68A and 68D, and a force is applied to the tube 44 adjacent to the end portions 50A and 50B to thereby fold the tube 44 as shown by the arrows "F1" and "F2". Folding of the tube 44 forms end portions 84A and 84B, and corners 46A and 46B, respectively. Sand or other temporary filler material may be positioned inside tube 44 at fold lines 68A and 68D to assist in the bending process.

With further reference to FIG. 9, forming tools 82C and 82D are then positioned adjacent the forming lines or location 68B and 68C (FIG. 5), and a force is applied to a tube 44 to thereby deform the tube as shown by the arrows "F3" and "F4". The ends 50A and 50B of tube 44 are then welded or otherwise secured together to form an air-tight seam 52.

As discussed above, the tubular primary structure 16 includes enlarged front and rear openings 22 and 24. The openings 22 and 24 generally define a rectangular perimeter 20, and the tubular primary structure 16 has a generally rectangular perimeter 18 in an elevational view (e.g. FIG. 9). The tubular primary structure 16 includes a generally rectangular "picture frame" front surface 86A and a rectangular rear surface 86B that is a mirror image of surface 86A. Referring again to FIG. 2, when assembled, the upright rear panel 28 is disposed adjacent or against rear surface 86A, and doors 10A and 10B are disposed against or adjacent surface 86A when the doors 10A and 10B are in the closed position.

Figure 10:
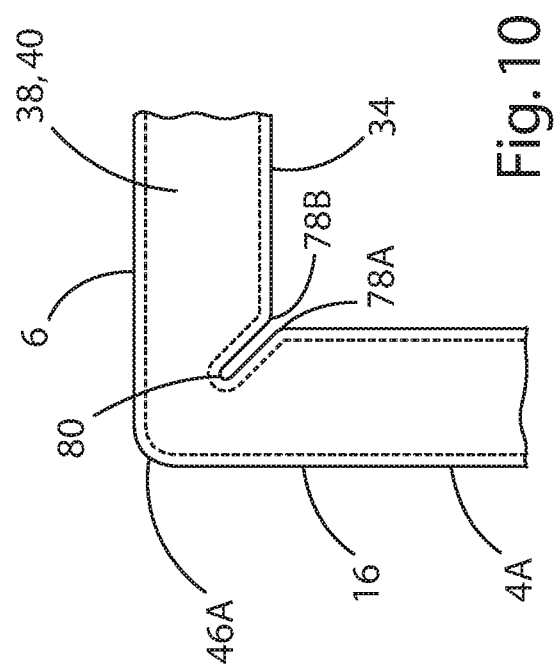
FIG. 10 is a partially fragmentary enlarged view of a portion of the tubular cabinet structure of FIG. 9.

With further reference to FIG. 10, after the tube 44 is deformed or folded to form corners 46A, 46B, 48A and 48B, the side walls of tube 44 generally deform as shown in FIG. 10 to form a crease 80 in inner wall 34 such that the surfaces 78A and 78B are directly adjacent one another, or in contact one another. In this way, the side walls 38 and 40 remain relatively flat in the region of the corners 46A, 46B, 38A and 38B. It will be understood that additional forming steps may be conducted in the vicinity of the corners to ensure that the outer surfaces of walls 38 and 40 are substantially planar.

Referring again to FIGS. 2 and 3, valves/openings 56 and 58 can be utilized to remove air from cavity 42 to form a vacuum. As discussed above, the filler material 54 may be inserted and compacted into the space 42 of tube 44 prior to formation of seam 52. Alternatively, the tube 44 may be formed as shown in FIGS. 4-9, and the filler material 54 may then be inserted into space 42 utilizing valves/openings 56 and 58. If the filler material 54 is inserted into the space 42 prior to formation of seam 52, the primary structure 16 can be positioned in a vacuum chamber (not shown) after formation of seam 52, and one or both of the valves 56 and/or 58 can be opened to thereby form a vacuum in the inner space 42. The valves 56 and 58 can then be closed, and the tubular primary structure 16 can then be removed from the vacuum chamber. If the filler material 54 is inserted into the tube 44 prior to formation of seam 52, the filler material 54 is preferably compacted prior to the bending process shown in FIGS. 8 and 9. The filler material 54 may be inserted and compacted by closing off an end 50A (FIG. 5) of tube 44 utilizing a permeable barrier or filter (not shown) that permits airflow, but prevents flow of the filler material 54. The filler material 54 can then be blown into the open end 50B. Air can be circulated along the length of the tube 44 to thereby compact and distribute the filler material 54 throughout the interior space 42.

The filler material 54 may also be added after the tube 44 is bent into an O-shape (e.g. FIGS. 8 and 9) and after the seam 52 is formed. In this case, the valves or openings 56 and 58 can be utilized to fill the space 42 with the filler material 54. For example, a permeable barrier or filter may be positioned over opening 58, and filler material 54 may be blown into the space 42 utilizing valve or opening 56. As the filler material 54 is blown into the interior space 42, the airflow through the space 42 compacts the filler material. The tubular structure 16 may then be placed in a vacuum chamber, and the valves or openings 56 and/or 58 may be utilized to form a vacuum in the space 42 as discussed above. In general, the filler material 54 may comprise silica powder such as fumed silica or other porous material. The filler material 54 counteracts the inward forces acting on tube 44 due to the vacuum in space 42 and thereby prevents collapse or deformation of the side walls 34, 36, 38 and 40 of tubular structure 16.

The invention claimed is:

1. A method of fabricating a vacuum insulated refrigerator cabinet structure, the method comprising:

forming an elongated tube;

forming a vacuum in an insulating space within the tube;

filling the insulating space with a porous filler material;

after filling the insulating space with a porous filler material, forming an airtight insulating space within the tube by sealing off the insulating space to maintain the vacuum in the airtight insulating space within the tube;

deforming the tube along at least four fold lines to form at least four corners whereby portions of the first primary surface adjacent each corner are substantially orthogonal relative to one another; and connecting a movable door to the structure adjacent the front opening whereby the door selectively closes off at least a portion of the front opening when the door is in a closed position, wherein forming the elongated tube comprises forming a generally planar first and second oppositely-facing primary outer surfaces and first and second end surface extending between the first and second primary outer surface;

wherein the insulating space is formed, at least in part, by connecting opposite ends of the tube to one another to form a primary structure having enlarged front and rear openings.

2. The method of claim 1, wherein:

forming the elongated tube comprises an extrusion process.

3. The method of claim 1, including:

utilizing an extrusion process to form the elongated tube;

cutting the elongated tube to length after a sufficient length of the tube is extruded.

4. The method of claim 1, wherein:
connecting the opposite ends of the tube to one another forms a refrigerator housing structure having horizontally spaced apart generally vertical side walls and vertically spaced apart generally horizontal upper and lower side walls, wherein the refrigerator housing structure defines an internal space with vertically enlarged front and rear openings.

5. The method of claim 4, including:
attaching an insulated rear panel to the refrigerator housing structure to at least partially close off the enlarged rear opening.

6. The method of claim 1, wherein:
the tube is formed by extruding a metal material.

7. The method of claim 1, wherein:
the tube is formed by extruding an impermeable polymer material.

8. The method of claim 1, wherein:
the tube is formed by extruding first and second layers of polymer material.

9. The method of claim 8, wherein:
at least one of the first layer and the second layer comprises a substantially impermeable polymer material.

10. The method of claim 9, wherein:
the first and second layers define substantially uniform first and second thicknesses, respectively, and wherein the first thickness is less than the second thickness.

11. The method of claim 6, wherein:
connecting the opposite ends of the tube to one another comprises welding the opposite ends together to form a seam.

12. The method of claim 1, including:
compacting the porous filler material prior to forming a vacuum in the insulating space.

13. The method of claim 12, wherein:
the porous filler material comprises fumed silica powder.

14. The method of claim 1, wherein:
the tube is placed in a vacuum chamber prior to forming an airtight insulating space within the tube.

15. The method of claim 1, including:
forming an indentation at each of the fold lines prior to forming the four corners.

16. The method of claim 1, wherein:
the tube is formed such that the tube has a substantially uniform cross sectional shape along a length of the tube.

17. The method of claim 1, including:
securing a rear wall to the primary structure to close off the enlarged rear opening to define an insulated food storage space; and
connecting a cooling system to the refrigerator cabinet structure to cool the insulated food storage space.

* * * * *